(12) United States Patent
Suzuki

(10) Patent No.: US 9,134,510 B2
(45) Date of Patent: Sep. 15, 2015

(54) IMAGING LENS

(71) Applicant: KANTATSU CO., LTD., Yaita-shi, Tochigi (JP)

(72) Inventor: Hisanori Suzuki, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 44 days.

(21) Appl. No.: 14/053,658

(22) Filed: Oct. 15, 2013

(65) Prior Publication Data
US 2014/0153114 A1 Jun. 5, 2014

(30) Foreign Application Priority Data
Dec. 5, 2012 (JP) .................. 2012-266107

(51) Int. Cl.
*G02B 9/60* (2006.01)
*G02B 13/18* (2006.01)
*G02B 3/02* (2006.01)
*G02B 13/00* (2006.01)
*G02B 5/18* (2006.01)

(52) U.S. Cl.
CPC .......... *G02B 13/0045* (2013.01); *G02B 5/1895* (2013.01); *G02B 9/60* (2013.01)

(58) Field of Classification Search
CPC .............. G02B 9/00; G02B 9/60; G02B 9/62; G02B 9/64; G02B 5/1842; G02B 5/189; G02B 5/1895; G02B 13/0045

USPC ......... 359/708, 713, 714, 737, 754–757, 759, 359/763, 764, 767
See application file for complete search history.

(56) References Cited

U.S. PATENT DOCUMENTS

2012/0162769 A1*  6/2012  Suzuki et al. .................. 359/558
2014/0362454 A1*  12/2014  Tsai et al. ..................... 359/714

FOREIGN PATENT DOCUMENTS

JP           4858648 B2      1/2012

* cited by examiner

*Primary Examiner* — Darryl J Collins
(74) *Attorney, Agent, or Firm* — Westerman, Hattori, Daniels & Adrian, LLP

(57) ABSTRACT

An imaging lens which can be very compact and thin, corrects various aberrations properly and provides a small F-value and a wide view angle at low cost. In the imaging lens, designed for a solid-state image sensor, arranged in the following order from an object side to an image side are: a first positive (refractive power) lens with a convex object-side surface; a second positive lens; a third positive lens; a fourth positive lens; and a fifth negative lens with a concave image-side surface. None of these lenses is joined to each other and all the lens surfaces are aspheric. The object-side and image-side aspheric surfaces of the fifth lens have a pole-change point in a position other than a point of intersection with an optical axis. A diffractive optical surface is formed on one of three surfaces from the first lens image-side surface to the second lens image-side surface.

12 Claims, 12 Drawing Sheets

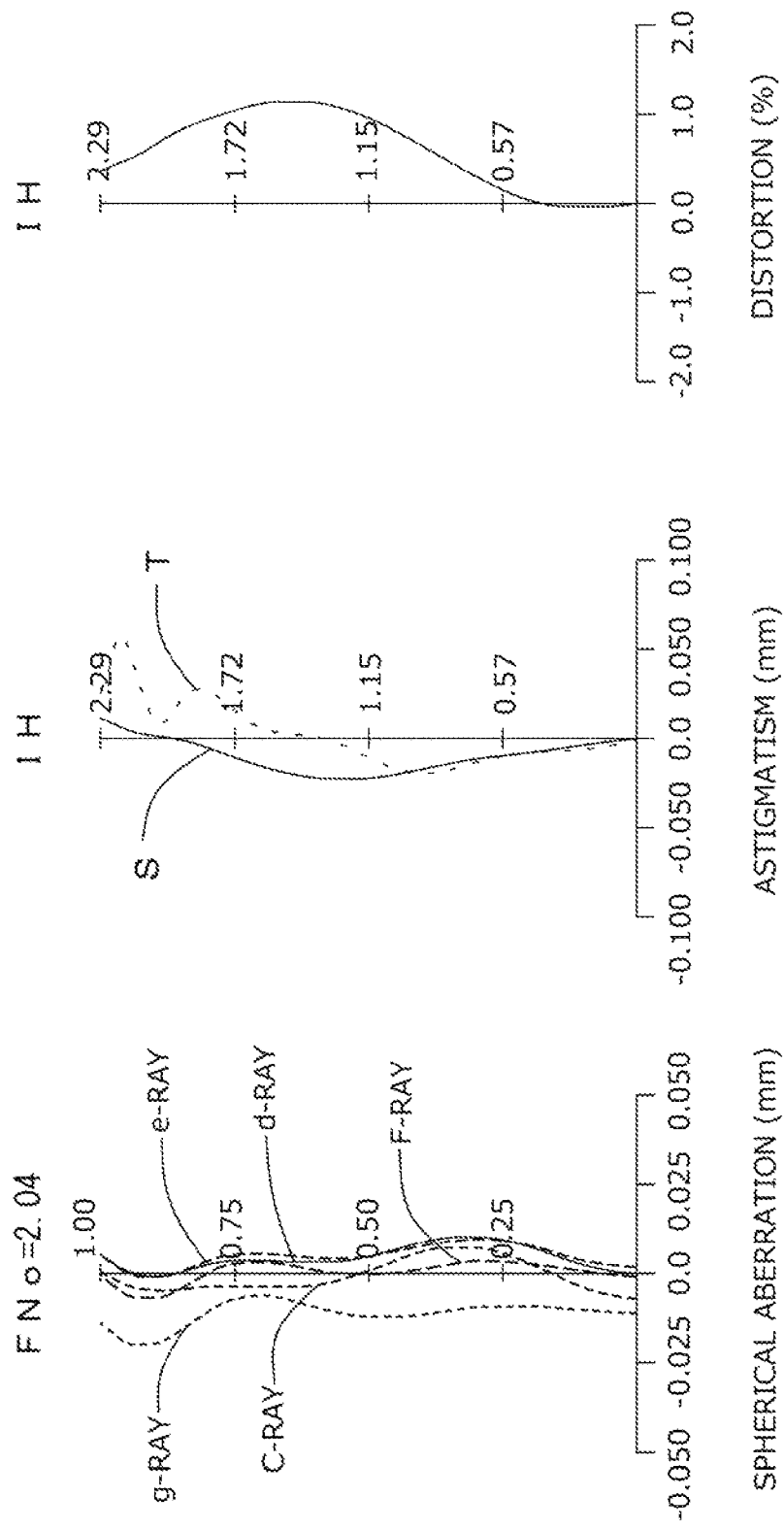

IMAGING LENS

The present application is based on and claims priority of Japanese patent application No. 2012-266107 filed on Dec. 5, 2012, the entire contents of which are hereby incorporated by reference.

BACKGROUND OF THE INVENTION

1. Field of the Invention

The present invention relates to imaging lenses to be built in image pickup devices using a solid-state image sensor such as a relatively compact and thin CCD sensor or CMOS sensor which are mounted in mobile terminals or PDAs (Personal Digital Assistants), such as mobile phones and smart phones.

2. Description of the Related Art

Today, mobile terminals and PDAs, such as mobile phones and smart phones, usually have a camera function which provides high resolution to cope with an increase in the number of pixels. In addition, for the purposes of increased convenience and better appearance of mobile terminals and PDAs, the demand for smaller and thinner image pickup devices which are mounted therein is growing. Therefore, an imaging lens which is built in an image pickup device is also strongly expected to provide higher resolution, more smallness (compactness) and more thinness (low-profile design) and also be a fast lens (namely a lens with a small F-value) and at the same time, to provide a wide angle of view to capture an image of an object in a wider perspective.

In order to meet the recent trend toward an increase in the number of pixels, as an imaging lens built in an image pickup device as mentioned above, an imaging lens composed of five lenses has been proposed which can provide higher resolution and higher performance than an imaging lens composed of four lenses. However, although in order to cope with an increase in the number of pixels it is effective to increase the number of constituent lenses, this approach makes it difficult to realize an imaging lens which meets the need for more compactness and thinness.

In order to correct chromatic aberration, many of the existing imaging lenses composed of five lenses use a combination of positive lenses made of a low-dispersion material and negative lenses made of a high-dispersion material. However, when the lens configuration includes many lenses with negative refractive power, the total track length tends to be long. In an attempt to shorten the total track length in this type of lens configuration, it is necessary to increase the positive lens refractive power. However, if the curvature radius of a lens surface is decreased to obtain the required positive refractive power, manufacturing error sensitivity would increase, leading to a lower productivity. In addition, increased positive lens refractive power is likely to cause an increase in the lens center thickness, making it difficult to achieve the desired thinness of the imaging lens. Thus, if a negative refractive power lens is employed, there is a problem to be addressed in order to satisfy the demand for a thin imaging lens. For example, the imaging lens described in Japanese Patent No. 4858648 (Patent Document 1) is known as an example of this type of imaging lens composed of five lenses.

Patent Document 1 discloses an imaging lens including, in order from an object side, a first lens with positive refractive power having a convex surface on the object side, a second lens with negative refractive power having a concave surface on an image side, a third lens with positive or negative refractive power, a fourth lens with positive refractive power having a convex surface on the image side, and a fifth lens with negative refractive power having a concave surface on the image side, in which the image-side surface of the fifth lens is aspheric and has an inflection point in a position other than a point of intersection with an optical axis.

The imaging lens described above in Patent Document 1 has brightness with an F-value of 2.0 or so and includes two or three negative lenses among its five lenses so that Petzval sum can be corrected easily and high imaging performance is ensured. However, since this configuration includes two or more negative lenses, it is disadvantageous in making the total track length short and has a difficulty in meeting the growing need for thinner devices. In fact, the ratio of total track length (TTL) to maximum image height (ih) (TTL/2ih) of the disclosed imaging lens is calculated as about 1.0, which suggests that it seems relatively compact and thin but its total track length is not short enough. Furthermore, since it uses a glass material, it is difficult to reduce cost. Therefore, this imaging lens cannot be said to provide the thinness, small F-value, and wide angle of view which have been expected in recent years and achieve cost reduction.

SUMMARY OF THE INVENTION

The present invention has been made in view of the above problem and an object thereof is to provide an imaging lens which can be very compact and thin with a total track length of about 4.0 mm or less and a TTL/2ih of 0.8 or less, has a small F-value, corrects various aberrations properly, and ensures a wide angle of view at low cost.

According to an aspect of the present invention, there is provided an imaging lens for a solid-state image sensor in which lenses are arranged in the following order from an object side to an image side: a first lens with positive refractive power having a convex surface on the object side; a second lens with positive refractive power; a third lens with positive refractive power; a fourth lens with positive refractive power; and a fifth lens with negative refractive power having a concave surface on the image side. None of the constituent lenses is joined to each other and all the lens surfaces are aspheric. The object-side aspheric surface and image-side aspheric surface of the fifth lens have a pole-change point in a position other than a point of intersection with an optical axis and a diffractive optical surface is formed on one of three surfaces from the image-side surface of the first lens to the image-side surface of the second lens.

In the above imaging lens, among its five constituent lenses, the four lenses from the object side, namely the first, second, third, and fourth lenses, do not have negative refractive power, or they all have positive refractive power so that the total optical length is short and the desired thinness of the imaging lens is achieved. In addition, the combined positive refractive power of the four constituent lenses is appropriately distributed to the lenses so that each lens need not to have larger refractive power than necessary and thus each lens can have a curvature radius large enough to allow each lens surface to be shaped so as to weaken its refractive power. This makes it possible that each lens has a sufficient edge thickness with a small center thickness, thereby contributing largely to a decrease in imaging lens thickness. Furthermore, weakening the refractive power of each lens surface decreases the manufacturing error sensitivity, leading to a drastic improvement in productivity. Also, since the fifth lens is shaped to have a concave surface with negative refractive power on the image side, it is easy to ensure an adequate back focus. Furthermore, since the object-side and image-side surfaces of the fifth lens have an aspheric shape with a pole-change point, the fifth lens effectively works mainly for correction of distortion and field curvature and effectively controls the angle of light rays incident on the image sensor. A "pole-change point" here means a point on an aspheric surface in which a tangential plane intersects the optical axis perpendicularly.

Furthermore, by forming an optimized diffractive optical surface, it is effective in correcting chromatic aberrations properly and achieving the desired thinness of the imaging lens without disposing a negative refractive power lens for chromatic aberration correction. A "diffractive optical surface" is formed by a relief which generates an optical path difference as defined by an optical path difference function. While the Abbe number of an ordinary optical material at e-ray is in the range from 25 to 80, the Abbe number of a diffractive optical surface at e-ray is about −3.3 (reverse sign), suggesting about one-digit larger dispersion.

An optimized diffractive optical surface means a surface near the aperture stop, that is a surface in which the diameter of the pencil of light rays is relatively large and there is least variation in the incidence angle and emission angle of a chief ray. If a surface meets these conditions, it can suppress flare which occurs due to secondary or tertiary light and improve the diffraction efficiency so that chromatic aberrations can be corrected effectively. In the imaging lens according to the present invention, a diffractive optical surface is formed on one of the following lenses which meet the above conditions: the image-side surface of the first lens, the object-side surface of the second lens, and the image-side surface of the second lens. Particularly, by forming a diffractive optical surface on a lens which enables light rays to enter and exit a lens surface almost perpendicularly to the lens surface, it enables to reduce the influence of flare. In the present invention it is preferable that a diffractive optical surface be formed on the image-side surface of the first lens. Although a diffractive optical surface formed on the object-side surface of the first lens is also effective in correcting chromatic aberrations as mentioned above, such a diffractive optical surface may be unfavorable from the viewpoint of product appearance.

An aperture stop may be located on a position which improves the diffractive efficiency, namely on the object side of the first lens, or between the first lens and the second lens, or between the second lens and the third lens. In the case of an imaging lens for a solid-state image sensor, the angle of light rays incident on the image plane must be minimized (as perpendicular to the image plane as possible) in order to ensure brightness in the peripheral area of the image plane and prevent a color shift phenomenon in the peripheral area of the image plane. Since the incidence angle of light rays can be decreased by keeping the exit pupil position distant from the image plane, preferably the aperture stop is as close to the object as possible and more preferably it is located on the object side of the first lens.

In the imaging lens according to the present invention, preferably the first lens is a biconvex lens. When the first lens is a biconvex lens, its object-side surface and image-side surface can share the positive refractive power which the lens should have and thus it is easy to shorten the total track length while preventing a rise in lens surface tolerance sensitivity.

When the object-side surface of the first lens is an aspheric surface in which a more distant portion from the optical axis has weaker positive refractive power, the refraction angle of incident light rays from the object side can be decreased and thus spherical aberrations and off-axial coma aberrations can be effectively suppressed. This aspheric surface is also effective in decreasing sensitivity to misalignment with a lens on the image side and it is easy to increase the lens effective diameter, offering an advantage in obtaining a small F-value.

In the imaging lens according to the present invention, preferably the second lens is a meniscus lens having a convex surface on the object side. The convex object-side surface of the second lens makes it easy to decrease the refraction angle of incident light rays and suppresses high-order aberrations which occur on the surface. The adoption of the meniscus shape permits shift of the principal point of the second lens on the image side to the object side, offering an advantage in shortening the total track length.

In the imaging lens according to the present invention, preferably the third lens is a lens both the surfaces of which are aspheric and in which a more distant portion from the optical axis has weaker positive refractive power and the refractive power changes to negative refractive power. Preferably the object-side and image-side surfaces of the third lens are aspheric surfaces in which the maximum amount of sag within the effective diameter is small. As a consequence, the third lens may be a flat lens whose thickness variation from the center to the peripheral portion is small. In other words, the lens can have weaker positive refractive power near the optical axis and weaker negative refractive power in the peripheral portion. This lens shape is effective in aberration correction and makes it easy to correct high-order spherical aberrations and off-axial coma aberrations properly. The ratio of the length of the third lens to the total track length can be minimized, offering an advantage in shortening the total track length.

In the imaging lens according to the present invention, preferably the fourth lens is a double-sided aspheric lens which has a meniscus shape with a concave surface on the object side near the optical axis and in which a more distant portion from the optical axis has weaker positive refractive power and the refractive power changes to negative refractive power in a peripheral portion.

The fourth lens has strong positive refractive power near the optical axis so as to keep the total track length short and has negative refractive power in the peripheral portion to make it easy to control the height of off-axial light rays adequately to enable the light rays to reach the desired maximum image height. Thus it is easy that the object-side surface and image-side surface of the fifth lens (located on the image side) having pole-change points optimize the angle of off-axial light rays controlled by the fourth lens and enable the light rays to arrive at the image sensor at an adequate angle from a low image height to a high image height.

Preferably the imaging lens according to the present invention satisfies conditional expressions (1) to (3) below:

$$1.0 < f1/f \quad (1)$$

$$1.0 < f2/f \quad (2)$$

$$0.8 < f4/f \quad (3)$$

where f represents the focal length of the overall optical system of the imaging lens, f1 represents the focal length of the first lens, f2 represents the focal length of the second lens, and f4 represents the focal length of the fourth lens.

In the imaging lens according to the present invention, the required positive refractive power of the overall optical system is given by the first, second, and fourth lenses. The conditional expressions (1) to (3) define optimum positive refractive power for these lenses respectively and indicate conditions to shorten the total track length while keeping the minimum required lens thickness. If the value is below the lower limit in any of the conditional expressions (1) to (3), the positive refractive power of the corresponding lens would be stronger, offering an advantage in shortening the total track length. However, too strong positive refractive power is undesirable because it tends to cause the optical system to have a high manufacturing error sensitivity. When the conditional expressions (1) to (3) are satisfied, each lens can have a sufficient edge thickness with a small center thickness and as a consequence, the imaging lens can be thin enough.

Preferably the imaging lens according to the present invention satisfies a conditional expression (4) below:

$$f123/f<1.5 \quad (4)$$

where f represents the focal length of the overall optical system of the imaging lens and f123 represents the composite focal length of the first lens, the second lens, and the third lens.

The conditional expression (4) indicates a condition to correct aberrations properly while keeping the total track length short. If the value is above the upper limit in the conditional expression (4), the combined refractive power of the first, second and third lenses would be too weak, making it difficult to keep the total track length short and correct spherical aberrations and astigmatism properly so that satisfactory imaging performance cannot obtained.

Preferably the imaging lens according to the present invention satisfies a conditional expression (5) below:

$$3.4<f45/f<9.1 \quad (5)$$

where f represents the focal length of the overall optical system of the imaging lens and f45 represents the composite focal length of the fourth lens and the fifth lens.

The conditional expression (5) indicates a condition to ensure an adequate back focus and control the angle of light rays incident on the image sensor while keeping the total track length short. If the value is below the lower limit in the conditional expression (5), the total track length could be short but the back focus would be too short, making it difficult to provide sufficient space for an IR cut filter or the like and control the angle of light rays incident on the image sensor. On the other hand, if the value is above the upper limit in the conditional expression (5), it would be easy to ensure an adequate back focus and control the angle of light rays incident on the image sensor but undesirably the total tack length would be long.

In the imaging lens according to the present invention, preferably all the constituent lenses are made of plastic material and satisfy conditional expressions (6) and (7) below:

$$1.50<Nd<1.65 \quad (6)$$

$$20<vd<70 \quad (7)$$

where Nd represents the refraction index of each lens at d-ray and vd represents the Abbe number of each lens at d-ray.

The conditional expressions (6) and (7) indicate conditions concerning the material of the first to fifth lenses. When a plastic material which satisfies the conditional expressions (6) and (7) is used for all the five constituent lenses, stable mass production and cost reduction can be achieved.

If a material with a high refractive index is used for at least one of the first, second, third, and fourth lenses, the total track length can be further shortened to achieve more thinness.

BRIEF DESCRIPTION OF THE DRAWINGS

FIG. 12 shows spherical aberration, astigmatism and distortion of the imaging lens according to Embodiment 6.

DETAILED DESCRIPTION OF THE PREFERRED EMBODIMENTS

Next, the preferred embodiments of the present invention will be described in detail referring to the accompanying drawings.

FIGS. 1, 3, 5, 7, 9, and 11 are schematic views showing the general configurations of the imaging lenses according to Embodiments 1 to 6 of the present invention respectively. Since all these embodiments have the same basic lens configuration, a general explanation of the lens configuration of each imaging lens according to the present invention is given below referring to the schematic view of Embodiment 1.

Figure 1:
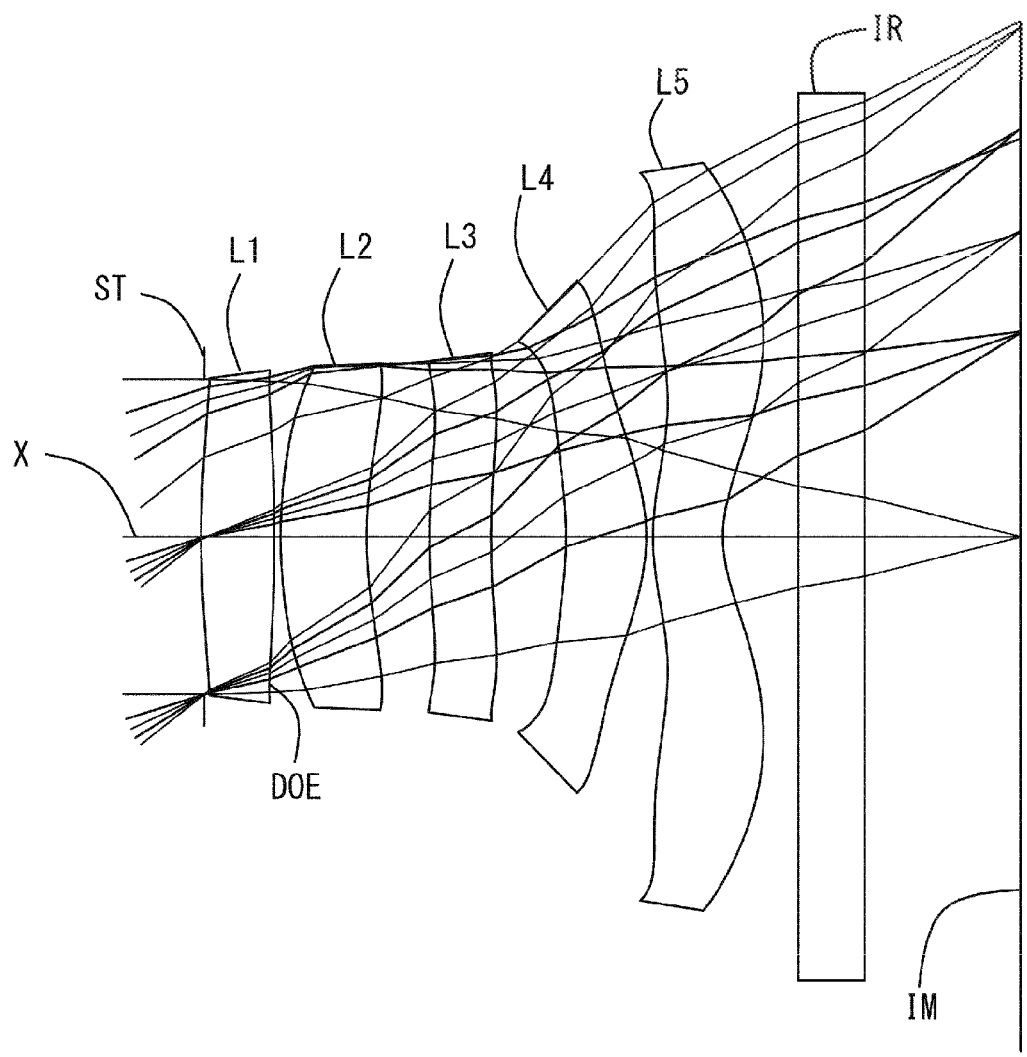
FIG. 1 is a schematic view showing the general configuration of an imaging lens according to Embodiment 1 of the invention.

As shown in FIG. 1, in the imaging lens according to Embodiment 1, lenses are arranged in the following order from the object side to the image side: an aperture stop ST, a first lens L1 with positive refractive power, a second lens L2 with positive refractive power, a third lens L3 with positive refractive power, a fourth lens L4 with positive refractive power, and a fifth lens L5 with negative refractive power. None of these constituent lenses is joined to each other and all the lens surfaces are aspheric. A diffractive optical surface DOE is formed on the image-side surface of the first lens L1. A diffractive optical surface DOE should be formed on at least one surface from the image-side surface of the first lens L1 to the image-side surface of the second lens L2.

A filter IR is located between the fifth lens L5 and an image plane IM. The filter IR is omissible. The total track length of the imaging lens is calculated based on the condition that the filter is removed.

In the above imaging lens composed of five lenses, the first lens L1 is a biconvex lens whose object-side surface and image-side surface are both convex, the second lens L2 is a meniscus lens having a convex object-side surface and a concave image-side surface, the third lens L3 is a meniscus lens having an object-side surface with a convex shape near the optical axis X and an image-side surface with a concave shape near the optical axis X, the fourth lens L4 is a meniscus lens having an object-side surface with a concave shape near the optical axis X and an image-side surface with a convex shape near the optical axis X, and the fifth lens L5 is a meniscus lens having an object-side surface with a convex shape near the optical axis X and an image-side surface with a concave shape near the optical axis X.

The third lens L3 should be a lens with positive refractive power near the optical axis: for example, it may have a convex surface near the optical axis on both sides or may be a meniscus lens with a concave surface on the object side. The fifth lens L5 should be a lens with negative refractive power having a concave surface on the image side: for example, it may be a biconcave lens.

Also, all the constituent lenses of the imaging lens according to the present invention are made of plastic material, so the imaging lens can be mass-produced at low cost. It is also possible to make all the five constituent lenses of the same material and in that case, productivity is improved. In Embodiment 6 of the present invention, all the constituent lenses are made of the same material.

The imaging lens according to the present invention satisfies the following conditional expressions:

$1.0 < f1/f$  (1)

$1.0 < f2/f$  (2)

$0.8 < f4/f$  (3)

$1.0 < f123/f < 1.5$  (4)

$3.4 < f45/f < 9.1$  (5)

$1.50 < Nd < 1.65$  (6)

$20 < vd < 70$  (7)

where
f: focal length of the overall optical system of the imaging lens
f1: focal length of the first lens L1
f2: focal length of the second lens L2
f4: focal length of the fourth lens L4
f123: composite focal length of the first lens L1, the second lens L2 and the third lens L3
f45: composite focal length of the fourth lens L4 and the fifth lens L5

Nd: refractive index of each lens at d-ray
vd: Abbe number of each lens at d-d-ray In the embodiments, all the lens surfaces are aspheric. The aspheric shapes of these lens surfaces are expressed by Equation 1, where Z represents an axis in the optical axis direction, Y represents a height perpendicular to the optical axis, K represents a conic constant, and $A_{2i}$ represents an aspheric surface coefficient.

$$Z = \frac{\frac{Y^2}{R}}{1 + \sqrt{1 - (1+K) \times \frac{Y^2}{R^2}}} + \sum_{i=1}^{8} A_{2i} \times Y^{2i}$$
Equation 1

An optical path difference caused by diffraction grating is expressed by a coefficient of optical path difference function P as defined by Equation 2, where Y represents a height from the optical axis and $B_{2i}$ represents an optical path difference function of the n(even-number)-th order. The coefficients of optical path difference function given in Tables 1 to 6 are based on the condition that the reference wavelength is e-ray of 546 nm.

$$P = \sum_{i=1}^{7} B_{2i} Y^{2i}$$
Equation 2

Next, the imaging lenses according to the embodiments of the present invention will be explained. In each embodiment, f represents the focal length of the overall optical system of the imaging lens, Fno represents an F-number, ω represents a half angle of view, and ih represents a maximum image height. represents a surface number counted from the object side, r represents a curvature radius, d represents the distance between lens surfaces on the optical axis (surface distance), Nd represents a refractive index with respect to d-ray (reference wavelength), and vd represents the Abbe number with respect to d-ray. As for aspheric surfaces, an asterisk (*) after surface number i indicates that the surface concerned is an aspheric surface. DOE indicates a surface on which a diffractive optical surface is formed.

Embodiment 1

The basic lens data of Embodiment 1 is shown below in

TABLE 1

| The diffractive optical surface DOE is formed on the image-side surface of the first lens L1. | | | | |
|---|---|---|---|---|
| Numerical Example 1 in mm | | | | |
| f = 2.883 | | | | |
| Fno = 2.03 | | | | |
| ω (°) = 38.40 | | | | |
| ih = 2.298 | | | | |
| Surface Data | | | | |
| Surface No. i | Curvature Radius r | Surface Distance d | Refractive Index Nd | Abbe Number vd |
| (Object Surface) | infinity | infinity | | |
| 1 (Stop) | infinity | −0.015 | | |
| 2* | 3.952 | 0.329 | 1.6355 | 23.91 |
| 3* (DOE) | −200.000 | 0.030 | | |
| 4* | 1.995 | 0.387 | 1.5438 | 55.57 |
| 5* | 1.940 | 0.282 | | |
| 6* | 2.938 | 0.280 | 1.5438 | 55.57 |

TABLE 1-continued

The diffractive optical surface DOE is formed on the image-side surface of the first lens L1.

| | | | | |
|---|---|---|---|---|
| 7* | 4.170 | 0.337 | | |
| 8* | −1.537 | 0.361 | 1.5438 | 55.57 |
| 9* | −0.835 | 0.030 | | |
| 10* | 1.098 | 0.314 | 1.5438 | 55.57 |
| 11* | 0.585 | 0.340 | | |
| 12 | Infinity | 0.300 | 1.5168 | 64.20 |
| 13 | Infinity | 0.700 | | |
| Image Plane | Infinity | | | |

Constituent Lens Data

| Lens | Start Surface | Focal Length |
|---|---|---|
| 1 | 2 | 4.762 |
| 2 | 4 | 87.517 |
| 3 | 6 | 16.925 |
| 4 | 8 | 2.846 |
| 5 | 10 | −2.933 |

Aspheric Surface Data

| | 2nd Surface | 3rd Surface | 4th Surface | 5th surface | 6th Surface |
|---|---|---|---|---|---|
| k | 2.581E+01 | 9.900E+01 | −6.293E−01 | −3.255E+00 | −9.900E+01 |
| A4 | −1.363E−01 | −5.920E−01 | −5.628E−01 | 1.149E−01 | 2.831E−01 |
| A6 | −7.368E−01 | 2.626E+00 | 3.017E+00 | −9.505E−01 | −2.652E+00 |
| A8 | 4.420E+00 | −5.951E+00 | −6.895E+00 | 6.089E+00 | 9.107E+00 |
| A10 | −1.414E+01 | 7.328E+00 | 8.156E+00 | −2.019E+01 | −2.091E+01 |
| A12 | 2.325E+01 | −3.614E+00 | −4.060E+00 | 3.444E+01 | 2.601E+01 |
| A14 | −1.591E+01 | 0.000E+00 | 0.000E+00 | −2.957E+01 | −1.342E+01 |
| A16 | 0.000E+00 | 0.000E+00 | 0.000E+00 | 1.005E+01 | 1.388E+00 |

| | 7th Surface | 8th Surface | 9th Surface | 10th Surface | 11th Surface |
|---|---|---|---|---|---|
| k | −2.928E+01 | 1.969E+00 | −1.069E+00 | −2.513E+00 | −4.983E+00 |
| A4 | 9.770E−02 | 1.161E+00 | 1.162E+00 | −9.294E−01 | −4.283E−01 |
| A6 | −1.166E+00 | −3.238E+00 | −3.226E+00 | 9.807E−01 | 4.355E−01 |
| A8 | 2.554E+00 | 8.838E+00 | 7.132E+00 | −5.123E−01 | −3.183E−01 |
| A10 | −4.058E+00 | −2.022E+01 | −9.479E+00 | 1.390E−01 | 1.554E−01 |
| A12 | 3.007E+00 | 3.250E+01 | 7.078E+00 | −1.574E−02 | −4.873E−02 |
| A14 | 0.000E+00 | −3.142E+01 | −2.739E+00 | 0.000E+00 | 9.036E−03 |
| A16 | 0.000E+00 | 1.326E+01 | 4.207E−01 | 0.000E+00 | −7.602E−04 |

Coefficient of Optical Path Difference Function

| | |
|---|---|
| B1 | −2.214E−02 |
| B2 | 3.586E−02 |
| B3 | −1.208E−01 |
| B4 | 2.185E−01 |
| B5 | 1.540E−02 |
| B6 | −5.213E−01 |
| B7 | 4.282E−01 |

As shown in Table 7, the imaging lens in Embodiment 1 satisfies all the conditional expressions (1) to (7).

Figure 2:
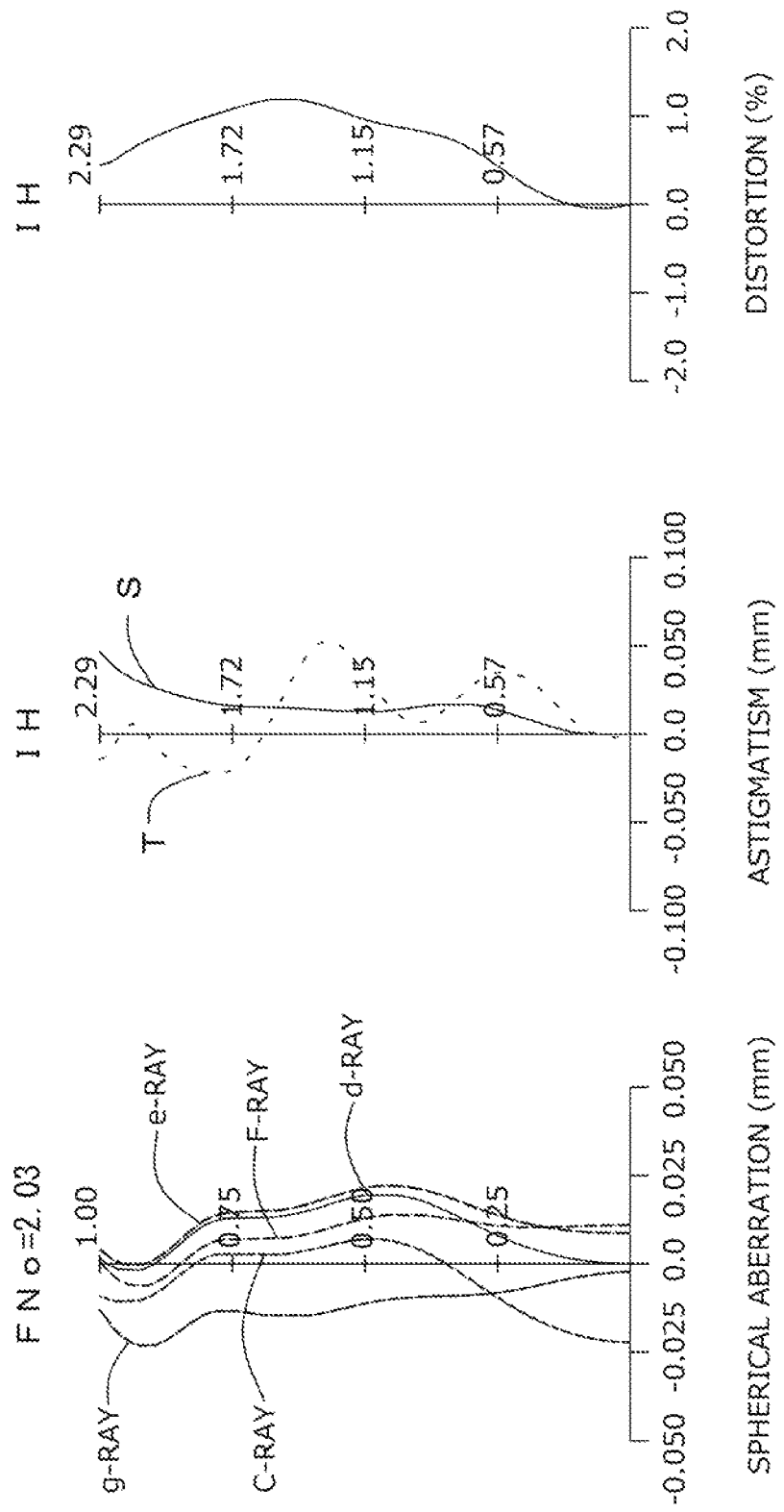
FIG. 2 shows spherical aberration, astigmatism and distortion of the imaging lens according to Embodiment 1.
Figure 3:
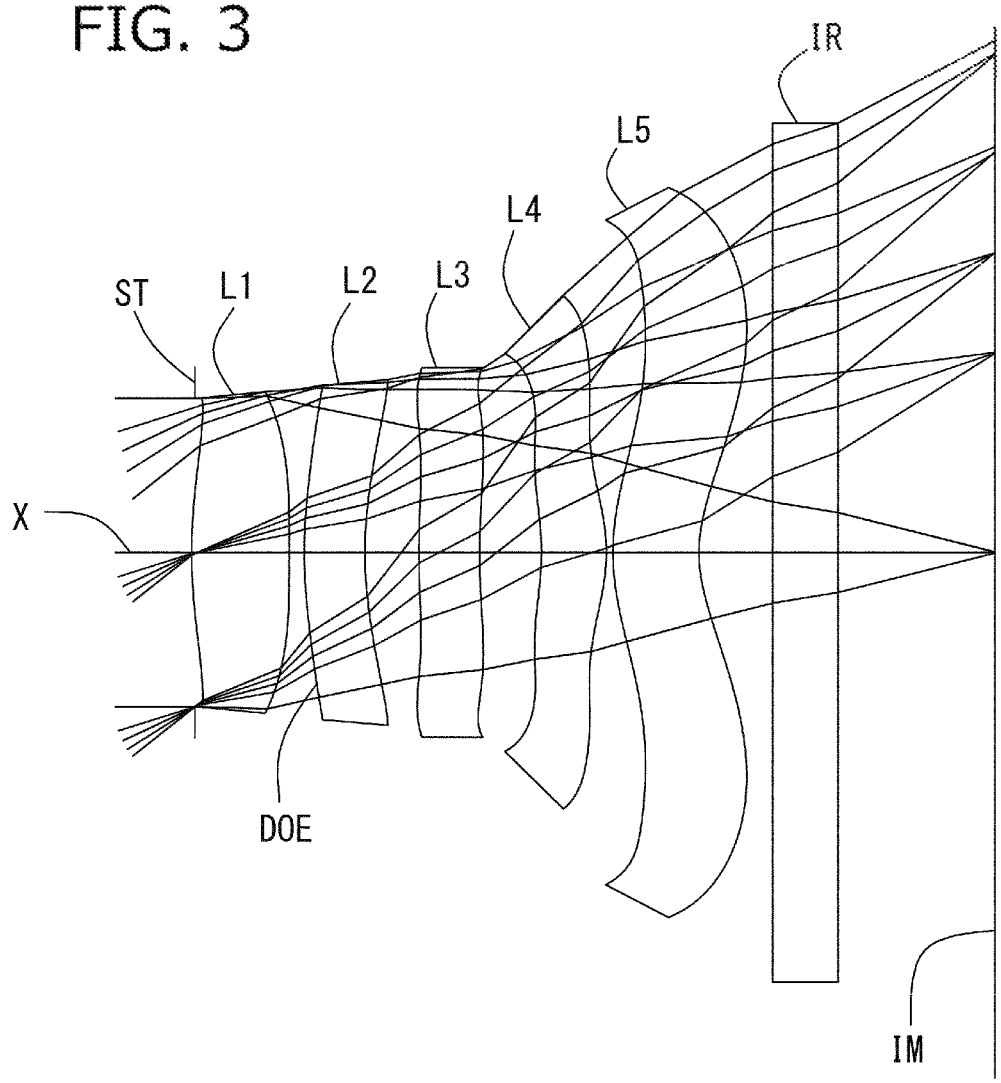
FIG. 3 is a schematic view showing the general configuration of an imaging lens according to Embodiment 2 of the invention.

FIG. 2 shows spherical aberration (mm), astigmatism (mm), and distortion (%) of the imaging lens in Embodiment 1. The spherical aberration graph shows the amount of aberration at wavelengths of F-ray (486 nm), d-ray (588 nm), g-ray (435 nm), e-ray (546 nm), and C-ray (656 nm). The astigmatism graph shows the amount of aberration on sagittal image surface S and the amount of aberration on tangential image surface T (the same is true for FIGS. 4, 6, 8, 10, and 12). As FIG. 2 suggests, various aberrations are properly corrected.

The total track length TTL is as short as 3.59 mm and the ratio of TTL to maximum image height ih (TTL/2ih) is 0.78, suggesting that the imaging lens is thin and compact though it is composed of five lenses. In addition, its F-value of 2.03 assures brightness and the half angle of view is relatively wide at about 38.4 degrees.

Embodiment 2

The basic lens data of Embodiment 2 is shown below in Table 2. The diffractive optical surface DOE is formed on the object-side surface of the second lens L2.

TABLE 2

Numerical Example 2 in mm
$f = 2.887$
$Fno = 2.03$
$\omega \, (°) = 38.36$
$ih = 2.298$

Surface Data

| Surface No. i | Curvature Radius r | Surface Distance d | Refractive Index Nd | Abbe Number νd |
|---|---|---|---|---|
| (Object Surface) | infinity | infinity | | |
| 1 (Stop) | infinity | −0.015 | | |
| 2* | 2.507 | 0.449 | 1.5438 | 55.57 |
| 3* (DOE) | −200.000 | 0.068 | | |
| 4* | 1.995 | 0.280 | 1.6355 | 23.91 |
| 5* | 1.815 | 0.248 | | |
| 6* | 4.042 | 0.280 | 1.5438 | 55.57 |
| 7* | 4.170 | 0.283 | | |
| 8* | −1.187 | 0.299 | 1.5438 | 55.57 |
| 9* | −0.813 | 0.030 | | |
| 10* | 1.083 | 0.396 | 1.5438 | 55.57 |
| 11* | 0.651 | 0.340 | | |
| 12 | Infinity | 0.300 | 1.5168 | 64.20 |
| 13 | Infinity | 0.722 | | |
| Image Plane | Infinity | | | |

Constituent Lens Data

| Lens | Start Surface | Focal Length |
|---|---|---|
| 1 | 2 | 4.557 |
| 2 | 4 | 42.885 |
| 3 | 6 | 136.698 |
| 4 | 8 | 3.705 |
| 5 | 10 | −4.426 |

Aspheric Surface Data

| | 2nd Surface | 3rd Surface | 4th Surface | 5th surface | 6th Surface |
|---|---|---|---|---|---|
| k | −2.372E+01 | 9.900E+01 | −6.517E−01 | −1.477E+00 | −9.900E+01 |
| A4 | −8.485E−01 | −7.659E−01 | −5.520E−01 | 3.582E−01 | −1.294E−01 |
| A6 | −4.267E−01 | 1.850E+00 | 1.259E+00 | −1.011E+01 | −2.002E+00 |
| A8 | 1.204E+00 | −3.581E+00 | −1.442E+00 | 7.201E+00 | 8.291E+00 |
| A10 | −2.870E+01 | 3.659E+00 | 6.634E−00 | −2.363E+01 | −1.583E+01 |
| A12 | 3.336E+01 | −1.535E+00 | −1.054E−00 | 3.991E+01 | 1.885E+01 |
| A14 | −1.591E+01 | 0.000E+00 | 0.000E+00 | −3.431E+01 | −1.244E+01 |
| A16 | 0.000E+00 | 0.000E+00 | 0.000E+00 | 1.177E+01 | 3.179E+00 |

| | 7th Surface | 8th Surface | 9th Surface | 10th Surface | 11th Surface |
|---|---|---|---|---|---|
| k | −5.527E+01 | 5.731E−01 | −2.181E+00 | −2.607E−00 | −5.697E+00 |
| A4 | 1.655E−02 | 1.968E+00 | 1.335E+00 | −4.345E−01 | −2.064E−01 |
| A6 | −2.035E+00 | −2.277E+00 | −8.749E+00 | 3.865E−01 | 1.609E−01 |
| A8 | 3.624E+00 | −4.294E+00 | −2.235E+00 | −2.428E−01 | −1.431E−01 |
| A10 | −2.471E+00 | 1.972E+01 | 4.608E+00 | 9.572E−01 | 1.002E−01 |
| A12 | 9.906E+00 | −3.346E+01 | −3.629E+00 | −1.670E−02 | −4.694E−02 |
| A14 | 0.000E+00 | 2.869E+01 | 1.366E+00 | 0.000E+00 | 1.240E−03 |
| A16 | 0.000E+00 | −9.944E+01 | −2.093E−01 | 0.000E+00 | −1.390E−04 |

Coefficient of Optical Path Difference Function

| | |
|---|---|
| B1 | −2.214E−02 |
| B2 | 3.586E−02 |
| B3 | −1.208E−01 |
| B4 | 2.185E−01 |
| B5 | 1.540E−02 |
| B6 | −5.213E−01 |
| B7 | 4.282E−01 |

As shown in Table 7, the imaging lens in Embodiment 2 satisfies all the conditional expressions (1) to (7).

Figure 4:
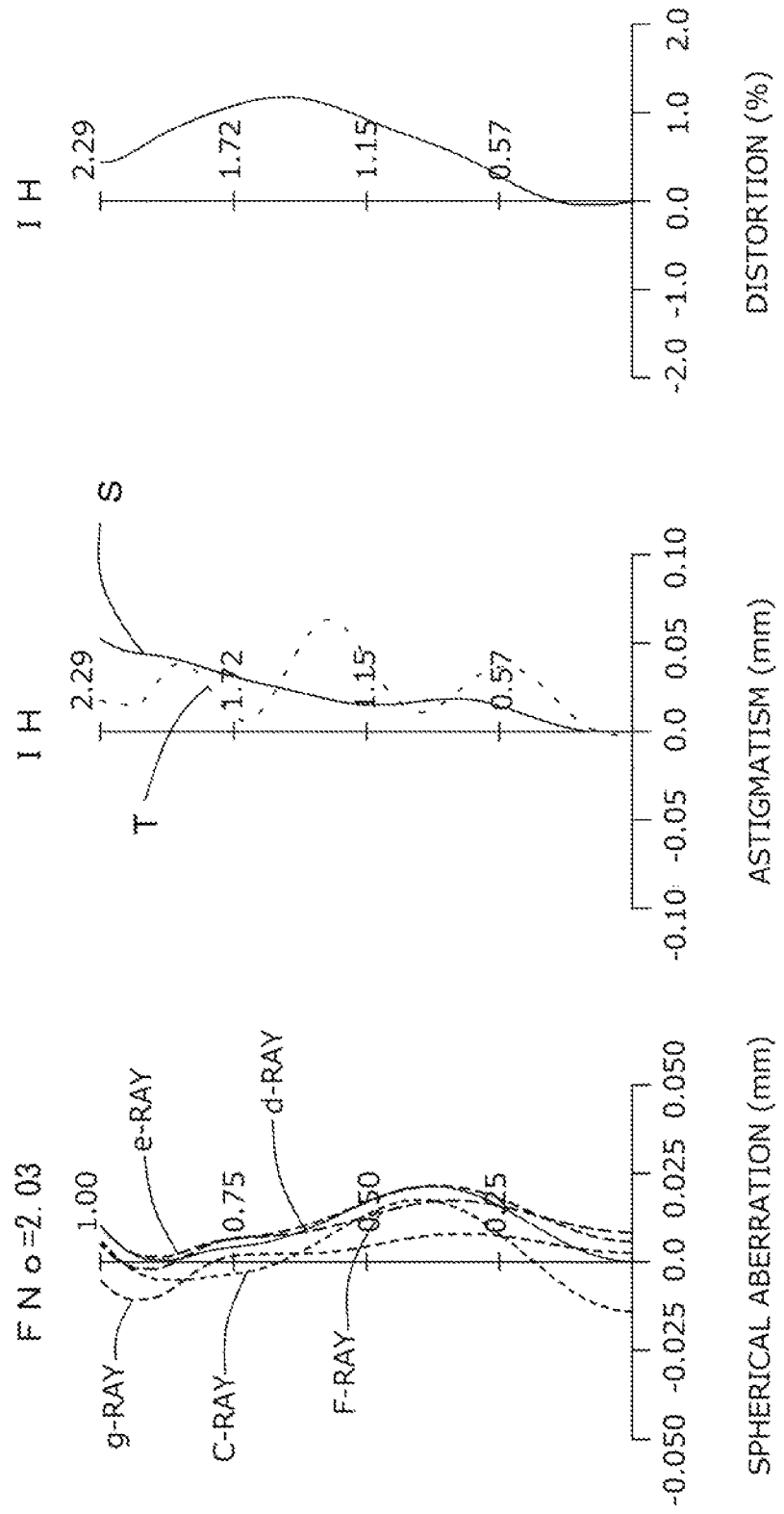
FIG. 4 shows spherical aberration, astigmatism and distortion of the imaging lens according to Embodiment 2.
Figure 5:
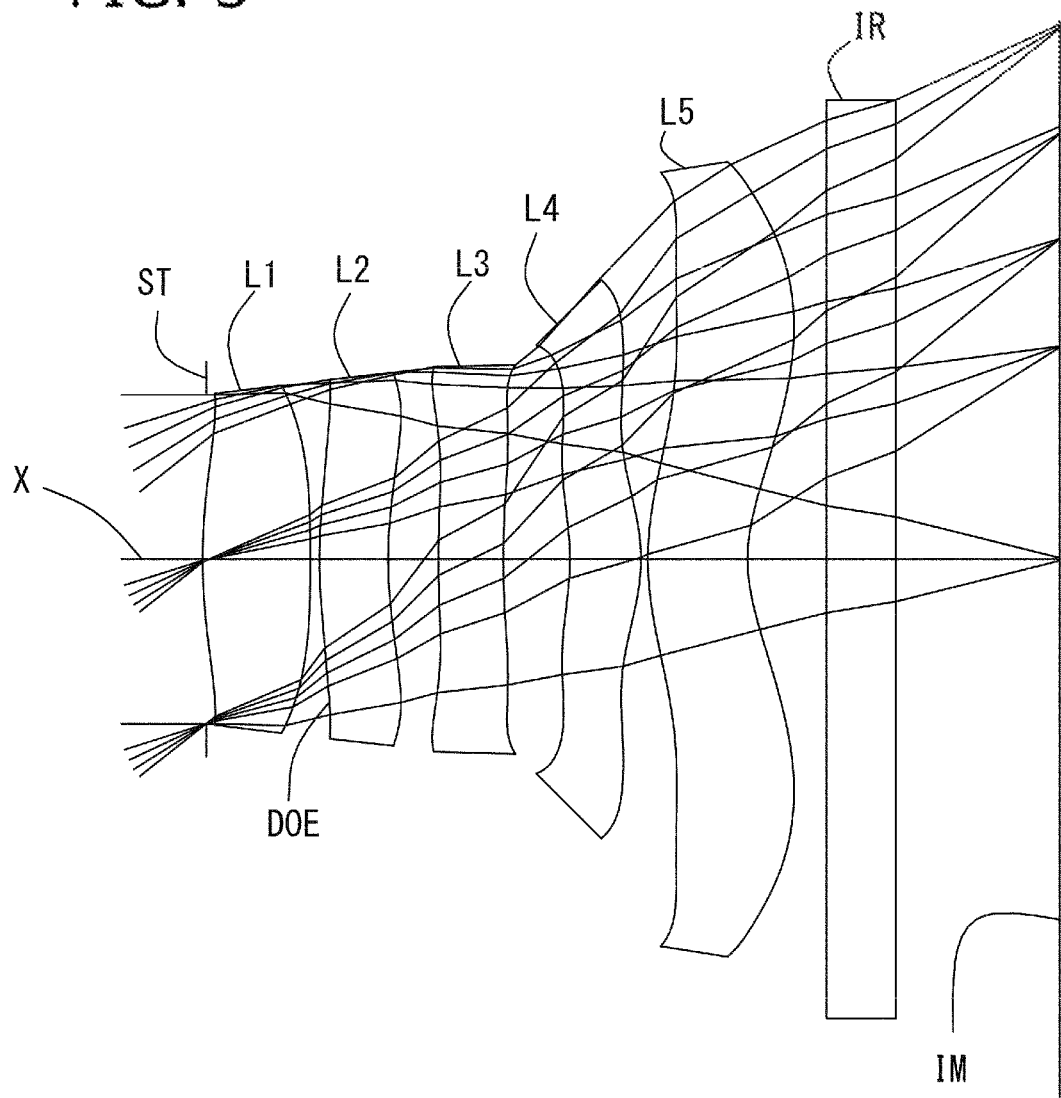
FIG. 5 is a schematic view showing the general configuration of an imaging lens according to Embodiment 3 of the invention.

FIG. 4 shows spherical aberration (mm), astigmatism (mm), and distortion (%) of the imaging lens in Embodiment 2. As FIG. 4 suggests, various aberrations are properly corrected.

The total track length TTL is as short as 3.59 mm and the ratio of TTL to maximum image height ih (TTL/2ih) is 0.78, suggesting that the imaging lens is thin and compact though it is composed of five lenses. In addition, its F-value of 2.03 assures brightness and the half angle of view is relatively wide at about 38.4 degrees.

Embodiment 3

The basic lens data of Embodiment 3 is shown below in Table 3. The diffractive optical surface DOE is formed on the object-side surface of the second lens L2.

TABLE 3

Numerical Example 3 in mm
f = 2.888
Fno = 2.03
ω (°) = 38.31
ih = 2.298

Surface Data

| Surface No. i | Curvature Radius r | Surface Distance d | Refractive Index Nd | Abbe Number vd |
|---|---|---|---|---|
| (Object Surface) | infinity | infinity | | |
| 1 (Stop) | infinity | −0.015 | | |
| 2* | 2.426 | 0.463 | 1.5438 | 55.57 |
| 3* (DOE) | −200.000 | 0.040 | | |
| 4* | 1.995 | 0.297 | 1.5438 | 55.57 |
| 5* | 1.815 | 0.217 | | |
| 6* | 4.150 | 0.280 | 1.6355 | 23.91 |
| 7* | 4.170 | 0.287 | | |
| 8* | −1.159 | 0.307 | 1.5438 | 55.57 |
| 9* | −0.783 | 0.030 | | |
| 10* | 1.267 | 0.430 | 1.5438 | 55.57 |
| 11* | 0.698 | 0.340 | | |
| 12 | Infinity | 0.300 | 1.5168 | 64.20 |
| 13 | Infinity | 0.705 | | |
| Image Plane | Infinity | | | |

Constituent Lens Data

| Lens | Start Surface | Focal Length |
|---|---|---|
| 1 | 2 | 4.412 |
| 2 | 4 | 44.995 |
| 3 | 6 | 211.431 |
| 4 | 8 | 3.451 |
| 5 | 10 | −3.898 |

Aspheric Surface Data

| | 2nd Surface | 3rd Surface | 4th Surface | 5th surface | 6th Surface |
|---|---|---|---|---|---|
| k | −7.352E+00 | −9.695E+01 | −3.897E+00 | −1.033E+01 | −9.900E+01 |
| A4 | −7.212E−03 | −9.703E−01 | −8.123E−01 | 8.370E−02 | −8.175E−01 |
| A6 | −6.733E−01 | 2.734E+00 | 2.084E+00 | −1.741E+00 | −2.412E+00 |
| A8 | 2.130E+00 | −5.148E+00 | −1.818E+00 | 1.089E+01 | 7.836E+00 |
| A10 | −4.842E+00 | 4.736E+00 | −1.470E+00 | −3.257E+01 | −7.598E+01 |
| A12 | 5.490E+00 | −1.651E+00 | 2.166E+00 | 4.755E+01 | −6.602E+01 |
| A14 | −2.568E+00 | 0.000E+00 | 0.000E+00 | −3.385E+01 | 1.939E+01 |
| A16 | 0.000E+00 | 0.000E+00 | 0.000E+00 | 9.819E+00 | −1.090E+00 |

| | 7th Surface | 8th Surface | 9th Surface | 10th Surface | 11th Surface |
|---|---|---|---|---|---|
| k | −3.009E+01 | 4.997E−01 | −2.048E+00 | −2.119E+00 | −6.257E+00 |
| A4 | 2.071E+00 | 1.908E+00 | 1.278E+00 | −4.014E−01 | −2.020E−01 |
| A6 | −2.258E+00 | −1.669E+00 | −6.210E+00 | 2.465E−01 | 1.630E−01 |
| A8 | 4.690E+00 | −6.329E+00 | −2.477E+00 | −7.621E−01 | −1.593E−01 |
| A10 | −3.863E+00 | 2.435E+01 | 4.796E+00 | 1.473E−01 | 1.174E−01 |
| A12 | 1.568E+00 | −3.893E+01 | −3.844E+00 | −1.817E−02 | −5.446E−02 |
| A14 | 0.000E+00 | 3.151E+01 | 1.511E+00 | 0.000E+00 | 1.373E−02 |
| A16 | 0.000E+00 | −1.032E+01 | −2.427E−01 | 0.000E+00 | −1.411E−03 |

Coefficient of Optical Path Difference Function

| | |
|---|---|
| B1 | −1.474E−02 |
| B2 | 7.176E−02 |
| B3 | −5.176E−01 |
| B4 | 1.634E+00 |
| B5 | −2.467E+00 |
| B6 | 1.627E+00 |
| B7 | −3.198E−01 |

As shown in Table 7, the imaging lens in Embodiment 3 satisfies all the conditional expressions (1) to (7).

Figure 6:
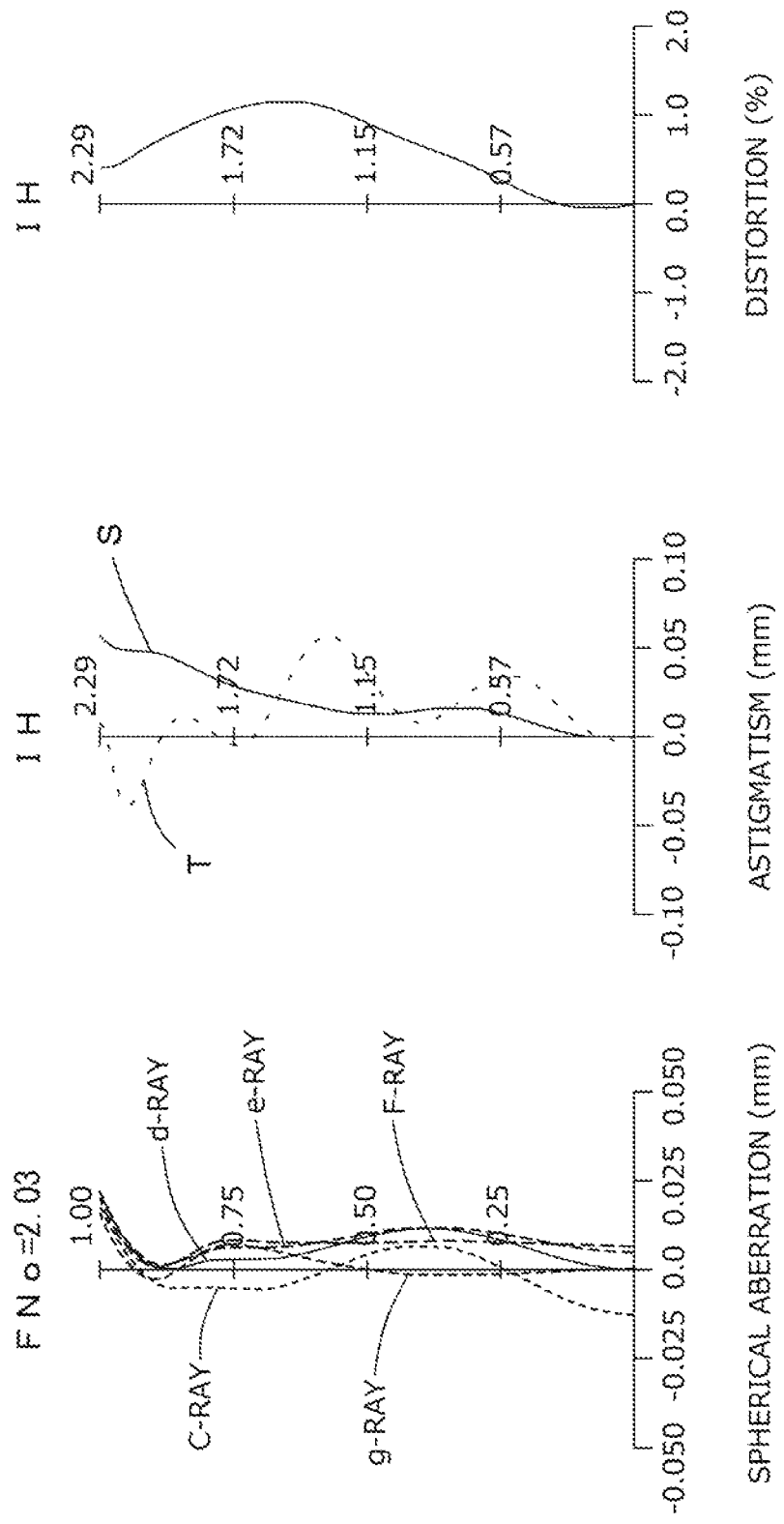
FIG. 6 shows spherical aberration, astigmatism and distortion of the imaging lens according to Embodiment 3.
Figure 7:
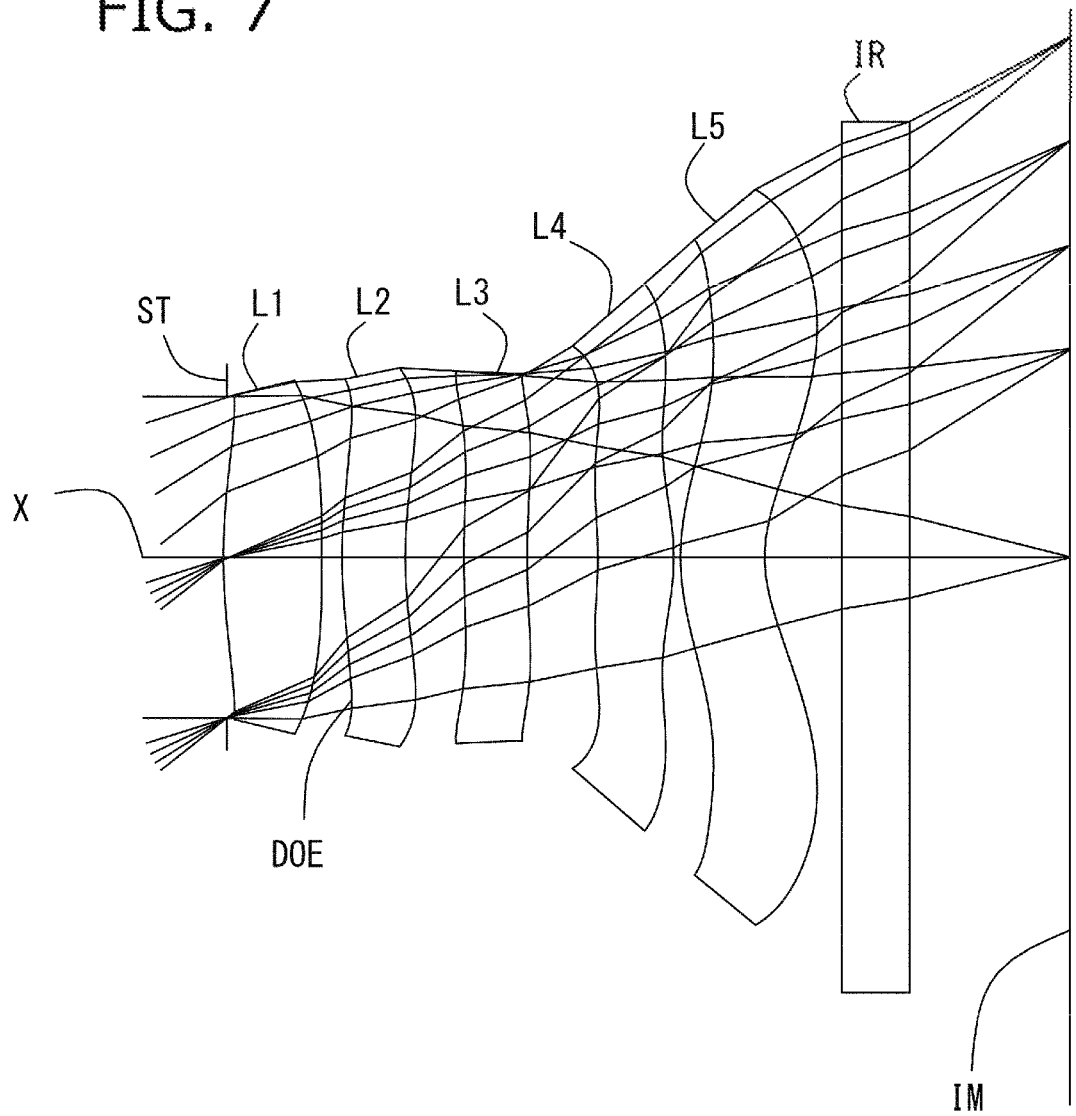
FIG. 7 is a schematic view showing the general configuration of an imaging lens according to Embodiment 4 of the invention.

FIG. 6 shows spherical aberration (mm), astigmatism (mm), and distortion (%) of the imaging lens in Embodiment 3. As FIG. 6 suggests, various aberrations are properly corrected.

The total track length TTL is as short as 3.59 mm and the ratio of TTL to maximum image height ih (TTL/2ih) is 0.78, suggesting that the imaging lens is thin and compact though it is composed of five lenses. In addition, its F-value of 2.03 assures brightness and the half angle of view is relatively wide at about 38.3 degrees.

Embodiment 4

The basic lens data of Embodiment 4 is shown below in Table 4. The diffractive optical surface DOE is formed on the object-side surface of the second lens L2.

TABLE 4

Numerical Example 4 in mm
f = 2.897
Fno = 2.04
ω (°) = 38.29
ih = 2.298

Surface Data

| Surface No. i | Curvature Radius r | Surface Distance d | Refractive Index Nd | Abbe Number νd |
|---|---|---|---|---|
| (Object Surface) | infinity | infinity | | |
| 1 (Stop) | infinity | −0.015 | | |
| 2* | 2.710 | 0.503 | 1.5346 | 56.16 |
| 3* (DOE) | −200.000 | 0.030 | | |
| 4* | 2.011 | 0.280 | 1.6355 | 23.91 |
| 5* | 2.000 | 0.235 | | |
| 6* | 4.150 | 0.280 | 1.5346 | 56.16 |
| 7* | 4.170 | 0.319 | | |
| 8* | −1.277 | 0.307 | 1.5346 | 56.16 |
| 9* | −0.812 | 0.030 | | |
| 10* | 1.069 | 0.394 | 1.5346 | 56.16 |
| 11* | 0.612 | 0.340 | | |
| 12 | Infinity | 0.300 | 1.5168 | 64.20 |
| 13 | Infinity | 0.722 | | |
| Image Plane | Infinity | | | |

Constituent Lens Data

| Lens | Start Surface | Focal Length |
|---|---|---|
| 1 | 2 | 5.005 |
| 2 | 4 | 21.772 |
| 3 | 6 | 275.382 |
| 4 | 8 | 3.386 |
| 5 | 10 | −3.83 |

Aspheric Surface Data

| | 2nd Surface | 3rd Surface | 4th Surface | 5th surface | 6th Surface |
|---|---|---|---|---|---|
| k | −5.946E+01 | 9.900E+01 | −5.432E+00 | −1.001E+01 | −9.797E+01 |
| A4 | −4.170E−01 | −9.474E−01 | −4.954E−01 | 8.747E−02 | 1.318E−01 |
| A6 | −5.081E+00 | 2.069E+00 | 7.331E−01 | −1.640E+00 | −2.133E+00 |
| A8 | 1.458E+00 | −3.605E+00 | −2.220E−01 | 7.525E+01 | 8.235E+00 |
| A10 | −3.291E+00 | 3.301E+00 | −1.612E+00 | −2.167E+01 | −1.586E+01 |
| A12 | 3.446E+00 | −1.316E+00 | 1.458E+00 | 3.382E+01 | 1.900E+01 |
| A14 | −1.714E+00 | 0.000E+00 | 0.000E+00 | −2.785E+01 | −1.424E+01 |
| A16 | 0.000E+00 | 0.000E+00 | 0.000E+00 | 9.640E+00 | 5.107E+00 |

| | 7th Surface | 8th Surface | 9th Surface | 10th Surface | 11th Surface |
|---|---|---|---|---|---|
| k | −6.305E+00 | 7.276E−01 | −2.047E+00 | −1.319E+00 | −5.206E+00 |
| A4 | 2.068E−01 | 1.928E+00 | 1.440E+00 | −5.566E−01 | −2.339E−01 |
| A6 | −1.952E+00 | −2.008E+00 | −9.092E−00 | 5.177E−01 | 2.475E−01 |
| A8 | 3.388E+00 | −4.839E+00 | −2.029E+00 | −4.039E−01 | −2.845E−01 |
| A10 | −1.989E+00 | 2.130E+01 | 3.653E+00 | 1.966E−01 | 2.251E−01 |
| A12 | 4.168E−01 | −3.704E+01 | −2.312E+00 | −3.915E−02 | −1.099E−01 |
| A14 | 0.000E+00 | 3.233E+01 | 6.060E−01 | 0.000E+00 | 2.957E−02 |
| A16 | 0.000E+00 | −1.132E+01 | −4.820E−02 | 0.000E+00 | −3.346E−03 |

Coefficient of Optical Path Difference Function

| B1 | −1.342E−02 |
| B2 | 6.813E−02 |
| B3 | −4.266E−01 |
| B4 | 1.503E+00 |
| B5 | −2.593E+00 |

TABLE 4-continued

| | |
|---|---|
| B6 | 1.901E+00 |
| B7 | −3.966E−01 |

As shown in Table 7, the imaging lens in Embodiment 4 satisfies all the conditional expressions (1) to (7).

Figure 8:
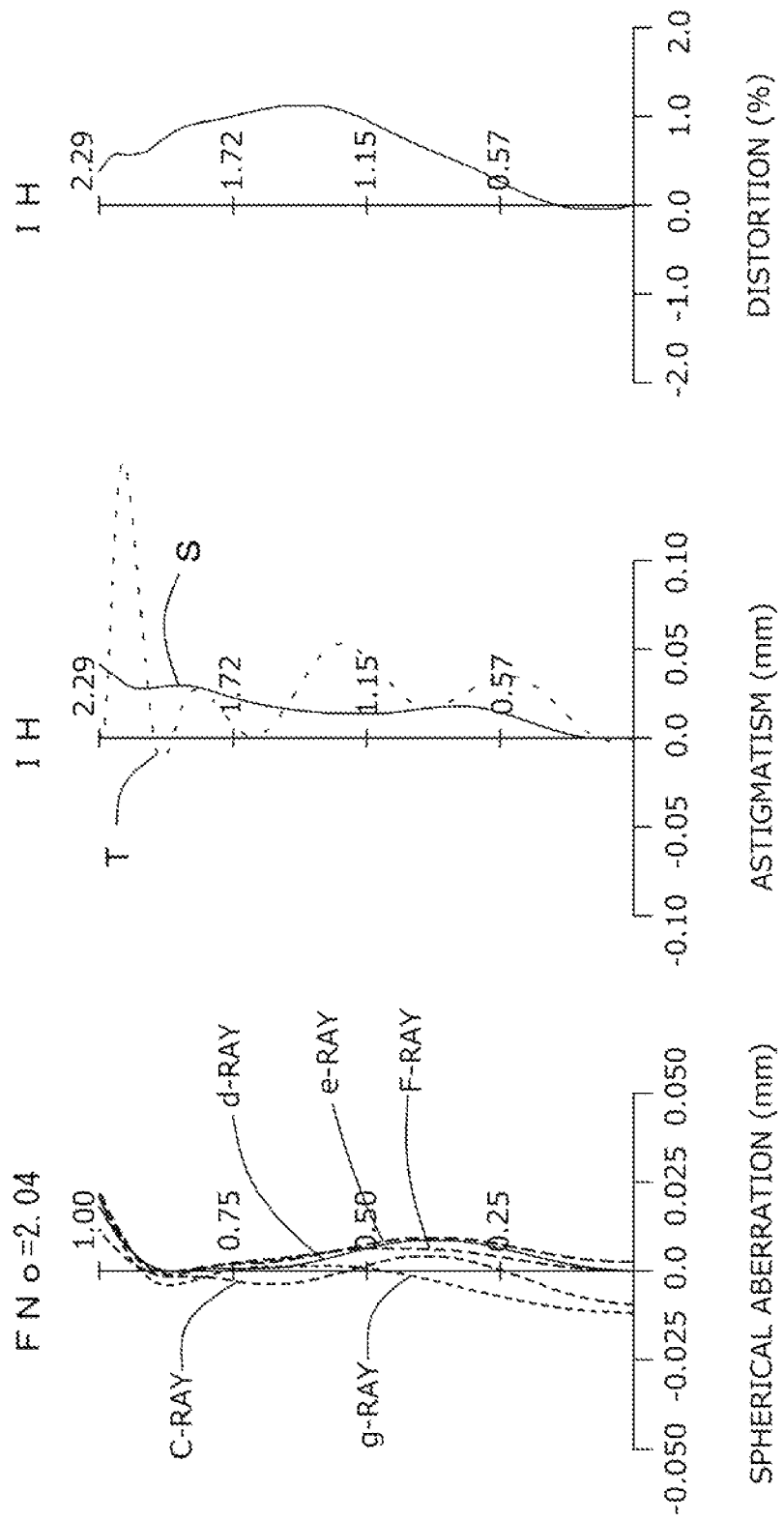
FIG. 8 shows spherical aberration, astigmatism and distortion of the imaging lens according to Embodiment 4.
Figure 9:
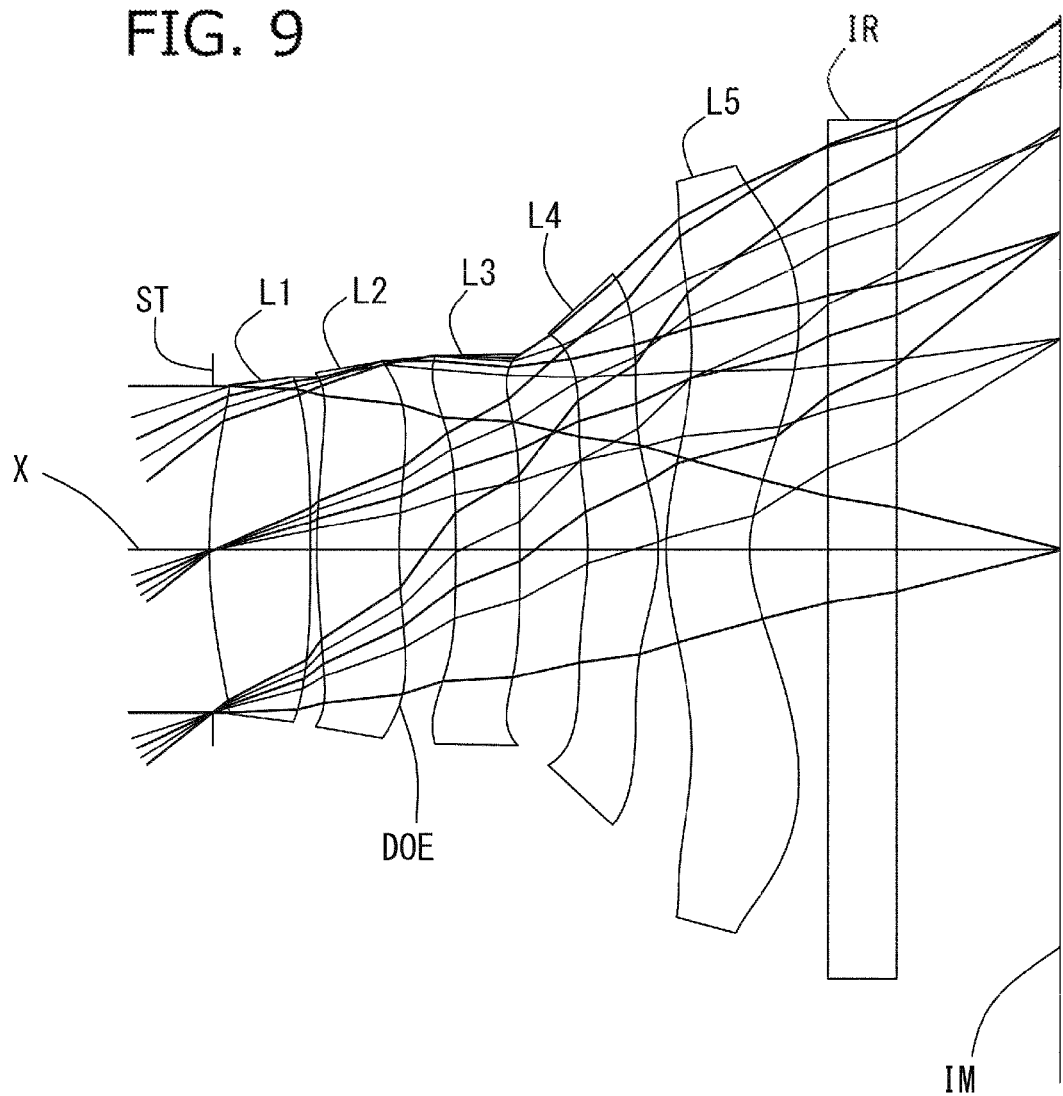
FIG. 9 is a schematic view showing the general configuration of an imaging lens according to Embodiment 5 of the invention.

FIG. 8 shows spherical aberration (mm), astigmatism (mm), and distortion (%) of the imaging lens in Embodiment 4. As FIG. 8 suggests, various aberrations are properly corrected.

The total track length TTL is as short as 3.64 mm and the ratio of TTL to maximum image height ih (TTL/2ih) is 0.79, suggesting that the imaging lens is thin and compact though it is composed of five lenses. In addition, its F-value of 2.04 assures brightness and the half angle of view is relatively wide at about 38.29 degrees.

Embodiment 5

The basic lens data of Embodiment 5 is shown below in Table 5. The diffractive optical surface DOE is formed on the image-side surface of the second lens L2.

TABLE 5

Numerical Example 5 in mm
f = 2.897
Fno = 2.04
ω (°) = 38.31
ih = 2.298

Surface Data

| Surface No. i | Curvature Radius r | Surface Distance d | Refractive Index Nd | Abbe Number vd |
|---|---|---|---|---|
| (Object Surface) | infinity | infinity | | |
| 1 (Stop) | infinity | 0.01 | | |
| 2* | 2.200 | 0.439 | 1.5438 | 55.57 |
| 3* (DOE) | −200.000 | 0.030 | | |
| 4* | 2.600 | 0.358 | 1.5438 | 55.57 |
| 5* | 2.410 | 0.243 | | |
| 6* | −35.500 | 0.280 | 1.6355 | 23.91 |
| 7* | −20.000 | 0.296 | | |
| 8* | −1.283 | 0.307 | 1.5438 | 55.57 |
| 9* | −0.749 | 0.034 | | |
| 10* | 1.274 | 0.363 | 1.5438 | 55.57 |
| 11* | 0.614 | 0.340 | | |
| 12 | Infinity | 0.300 | 1.5168 | 64.20 |
| 13 | Infinity | 0.711 | | |
| Image Plane | Infinity | | | |

Constituent Lens Data

| Lens | Start Surface | Focal Length |
|---|---|---|
| 1 | 2 | 4.005 |
| 2 | 4 | 58.383 |
| 3 | 6 | 75.796 |
| 4 | 8 | 2.756 |
| 5 | 10 | −2.700 |

Aspheric Surface Data

| | 2nd Surface | 3rd Surface | 4th Surface | 5th surface | 6th Surface |
|---|---|---|---|---|---|
| k | 1.430E+00 | 1.500E+00 | 1.540E+00 | 1.640E+00 | 1.690E+00 |
| A4 | −6.295E−02 | −5.732E−01 | −5.810E−01 | 9.373E−02 | −3.991E−01 |
| A6 | 1.175E−01 | 1.847E+00 | 1.911E+00 | −2.335E+00 | −7.812E+01 |
| A8 | −1.137E+00 | −3.835E+00 | −3.628E+00 | 9.711E+00 | 9.570E+01 |
| A10 | 3.302E+00 | 4.137E+00 | 3.111E+00 | −2.907E+01 | 3.642E+00 |
| A12 | −4.317E+00 | −2.165E+00 | −2.029E+00 | 4.862E+01 | −3.243E+00 |
| A14 | 1.913E+00 | 0.000E+00 | 0.000E+00 | −4.080E+01 | −3.142E+00 |
| A16 | 0.000E+00 | 0.000E+00 | 0.000E+00 | 1.348E+01 | 3.141E+00 |

| | 7th Surface | 8th Surface | 9th Surface | 10th Surface | 11th Surface |
|---|---|---|---|---|---|
| k | 1.700E+00 | 1.880E−01 | 2.400E+00 | 3.200E+00 | 3.340E+00 |
| A4 | −4.646E−01 | 1.588E+00 | 1.462E+00 | −3.812E−01 | −2.167E−01 |
| A6 | −1.346E−01 | −1.934E+00 | −1.480E+00 | 2.696E−01 | 1.661E−01 |
| A8 | 2.367E+00 | −2.807E+00 | −1.029E+00 | −1.357E−01 | −1.361E−01 |
| A10 | −7.985E+00 | 1.339E+01 | 3.824E+00 | 4.598E−01 | 8.178E−02 |
| A12 | −5.916E−01 | −2.117E+01 | −3.824E+00 | −6.638E−03 | −3.248E−02 |
| A14 | 0.000E+00 | 1.676E+01 | 1.765E+01 | 0.000E+00 | 7.096E−03 |
| A16 | 0.000E+00 | −5.586E+01 | −3.216E−01 | 0.000E+00 | −6.047E−04 |

TABLE 5-continued

| Coefficient of Optical Path Difference Function | |
|---|---|
| B1 | −1.107E−02 |
| B2 | −4.599E−03 |
| B3 | 2.751E−02 |
| B4 | 1.552E−02 |
| B5 | −2.839E−02 |
| B6 | −7.860E−02 |
| B7 | 3.966E−02 |

As shown in Table 7, the imaging lens in Embodiment 5 satisfies all the conditional expressions (1) to (7).

Figure 10:
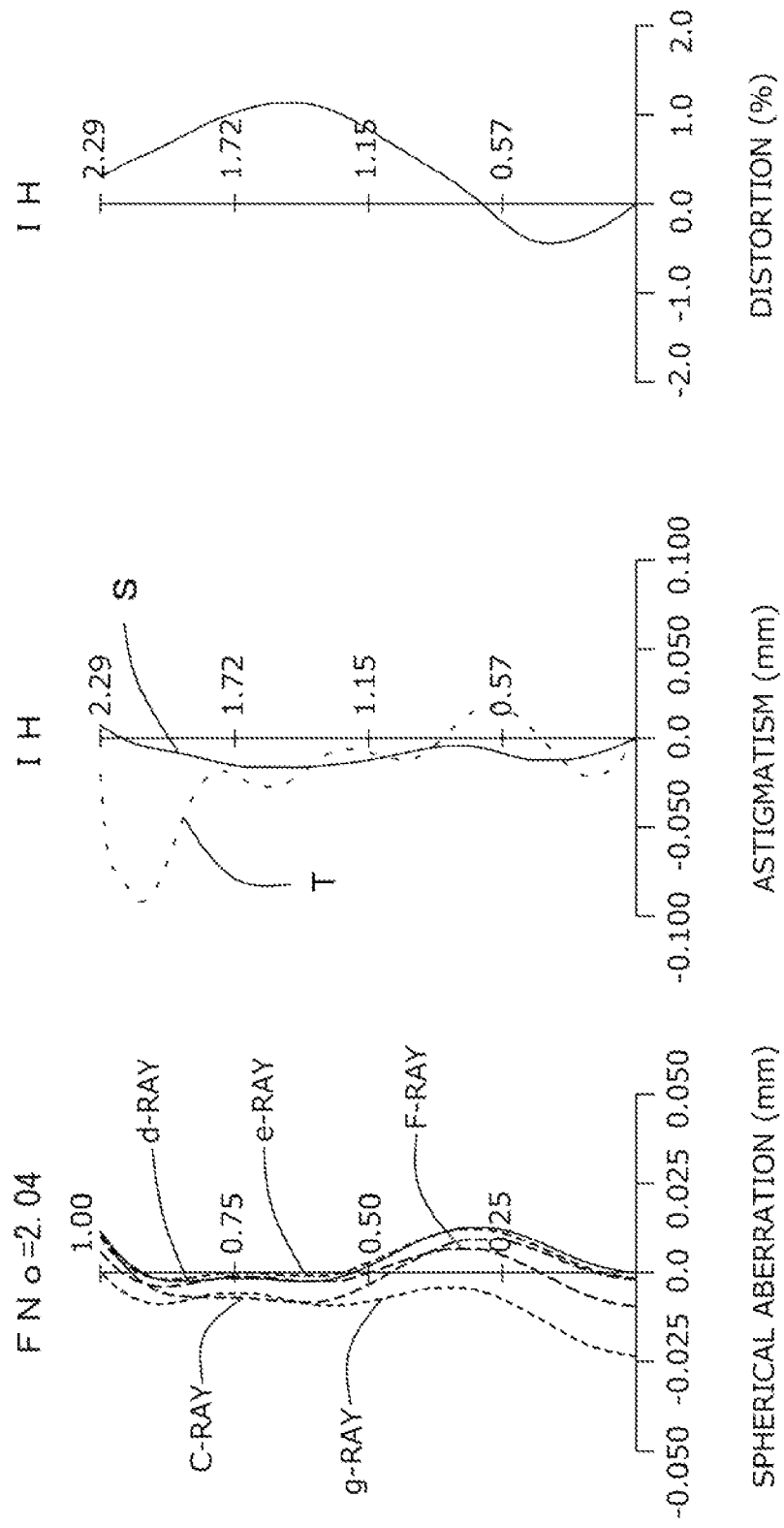
FIG. 10 shows spherical aberration, astigmatism and distortion of the imaging lens according to Embodiment 5.
Figure 11:
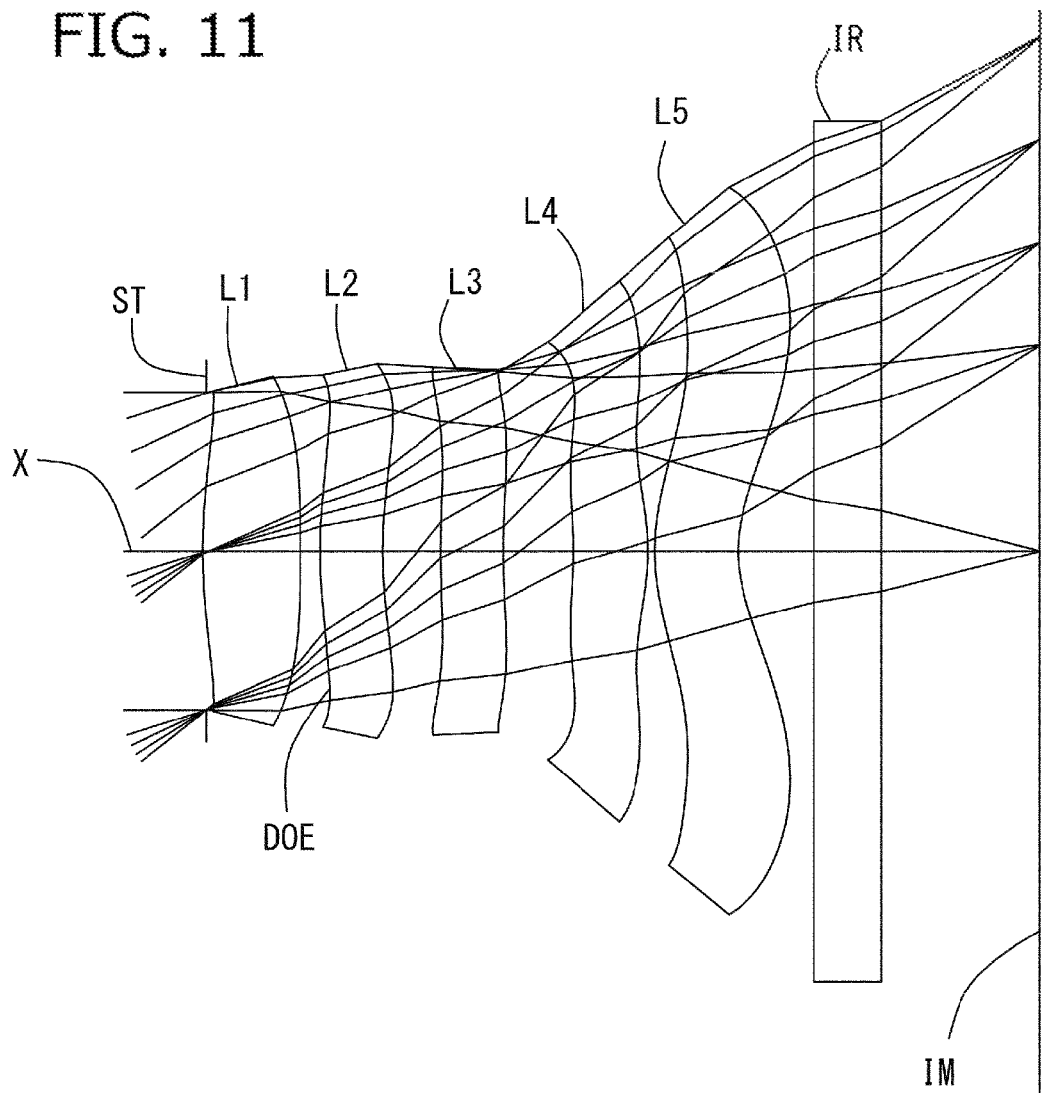
FIG. 11 is a schematic view showing the general configuration of an imaging lens according to Embodiment 6 of the invention.

FIG. 10 shows spherical aberration (mm), astigmatism (mm), and distortion (%) of the imaging lens in Embodiment 5. As FIG. 10 suggests, various aberrations are properly corrected.

The total track length TTL is as short as 3.60 mm and the ratio of TTL to maximum image height ih (TTL/2ih) is 0.78, suggesting that the imaging lens is thin and compact though it is composed of five lenses. In addition, its F-value of 2.04 assures brightness and the half angle of view is relatively wide at about 38.3 degrees.

Embodiment 6

The basic lens data of Embodiment 6 is shown below in Table 6. The diffractive optical surface DOE is formed on the object-side surface of the second lens L2.

TABLE5?

Numerical Example 6 in mm
f = 2.893
Fno = 2.04
ω (°) = 38.19
ih = 2.2975

| Surface No. i | Curvature Radius r | Surface Distance d | Refractive Index Nd | Abbe Number νd |
|---|---|---|---|---|
| (Object Surface) | infinity | infinity | | |
| 1 (Stop) | infinity | 0.015 | | |
| 2* | 2.683 | 0.433 | 1.5346 | 55.16 |
| 3* | −200.000 | 0.090 | | |
| 4* (DOE) | 2.011 | 0.280 | 1.5346 | 56.16 |
| 5* | 2.000 | 0.259 | | |
| 6* | 4.150 | 0.280 | 1.5346 | 56.16 |
| 7* | 4.170 | 0.312 | | |
| 8* | −2.023 | 0.335 | 1.5346 | 56.16 |
| 9* | −1.045 | 0.030 | | |
| 10* | 1.039 | 0.372 | 1.5346 | 56.16 |
| 11* | 0.629 | 0.340 | | |
| 12 | Infinity | 0.300 | 1.5168 | 64.20 |
| 13 | Infinity | 0.707 | | |
| Image Plane | Infinity | | | |

Constituent Lens Data

| Lens | Start Surface | Focal Length |
|---|---|---|
| 1 | 2 | 4.955 |
| 2 | 4 | 27.193 |
| 3 | 6 | 275.382 |
| 4 | 8 | 3.612 |
| 5 | 10 | −4.355 |

Aspheric Surface Data

| | 2nd Surface | 3rd Surface | 4th Surface | 5th surface | 6th Surface |
|---|---|---|---|---|---|
| k | 1.424E+00 | 1.480E+00 | 1.620E+00 | 1.620E+00 | 1.680E+00 |
| A4 | 1.276E−01 | −7.046E−01 | −6.566E−01 | −2.989E−01 | −2.180E−01 |
| A6 | −6.588E−02 | 1.857E+00 | 1.597E+00 | 4.681E−01 | −1.319E+00 |
| A8 | 5.679E−01 | −3.786E+00 | −1.809E+00 | 1.373E−01 | 5.198E+00 |
| A10 | −1.096E+00 | 4.120E+00 | 1.533E−01 | −2.863E+00 | −5.422E+00 |
| A12 | 1.089E+00 | −1.949E+00 | 7.622E−02 | 1.082E+00 | −6.899E+00 |
| A14 | 3.067E−01 | 0.000E+00 | 0.000E+00 | 4.102E+00 | 1.903E+01 |
| A16 | 0.000E+00 | 0.000E+00 | 0.000E+00 | −3.127E+00 | −1.072E+01 |

| | 7th Surface | 8th Surface | 9th Surface | 10th Surface | 11th Surface |
|---|---|---|---|---|---|
| k | 1.830E+00 | 1.920E+00 | 2.560E+00 | 3.020E+00 | 3.340E+00 |
| A4 | 1.244E−01 | 1.662E+00 | 1.494E−00 | −5.972E−01 | −2.215E−01 |
| A6 | −2.206E+00 | −3.610E+00 | −1.938E+00 | 4.613E−01 | 1.610E−01 |
| A8 | 5.302E+00 | 4.484E+00 | 7.467E+01 | −2.808E−01 | −1.373E−01 |

TABLE5-continued

| | | | | | |
|---|---|---|---|---|---|
| A10 | −5.966E+00 | −3.518E+00 | 5.205E−01 | 1.193E−01 | 9.727E−02 |
| A12 | 3.024E+00 | 8.827E−01 | −6.628E−01 | −2.295E−02 | −4.755E−02 |
| A14 | 0.000E+00 | 9.375E−01 | 2.648E+01 | 0.000E+00 | 1.337E−02 |
| A16 | 0.000E+00 | −5.915E−01 | −4.099E+02 | 0.000E+00 | −1.607E−03 |

Coefficient of Optical Path Difference Function

| | |
|---|---|
| B1 | −1.118E−02 |
| B2 | 5.129E−02 |
| B3 | −4.362E−01 |
| B4 | 1.496E+00 |
| B5 | −2.250E+00 |
| B6 | 1.221E+00 |
| B7 | 9.142E−03 |

All the constituent lenses of the imaging lens in Embodiment 6 are made of the same material, so productivity can be improved. As shown in Table 7, the imaging lens in Embodiment 6 satisfies all the conditional expressions (1) to (7).

FIG. 12 shows spherical aberration (mm), astigmatism (mm), and distortion (%) of the imaging lens in Embodiment 6. As FIG. 12 suggests, various aberrations are properly corrected.

The total track length TTL is as short as 3.64 mm and the ratio of TTL to maximum image height ih (TTL/2ih) is 0.79, suggesting that the imaging lens is thin and compact though it is composed of five lenses. In addition, its F-value of 2.04 assures brightness and the half angle of view is relatively wide at about 38.2 degrees.

As explained so far, the imaging lenses according to the above embodiments of the present invention provide a very short optical system with a total track length TTL of 3.7 mm or less though they are composed of five lenses and also they feature compactness and thinness with a ratio of total track length to maximum image height ih (TTL/2ih) of 0.8 or less. In addition, although they assure brightness with an F-value of about 2.0, aberrations are properly corrected and the angle of view is as wide as about 76 degrees.

Table 7 shows data on Embodiments 1 to 6 relating to the conditional expressions (1) to (7).

The imaging lenses according to the above embodiments of the present invention which are each composed of five lenses can be suitably applied to imaging optical systems mounted in mobile terminals and PDAs (Personal Digital Assistants) such mobile phones and smart phones which are becoming thinner and provide an increasing number of pixels.

The effects of the present invention are as follows.

According to the present invention, it is possible to provide an imaging lens which can correct various aberrations properly and is compact and thin enough and provides a relatively wide angle of view and high brightness.

What is claimed is:

1. An imaging lens for a solid-state image sensor in which lenses are arranged in order from an object side to an image side, comprising:
a first lens with positive refractive power having a convex surface on the object side;
a second lens with positive refractive power;
a third lens with positive refractive power;
a fourth lens with positive refractive power; and
a fifth lens with negative refractive power having a concave surface on the image side,
wherein none of the constituent lenses is joined to each other;
wherein all the lens surfaces are aspheric;

TABLE 7

| | | Embodiment 1 | Embodiment 2 | Embodiment 3 | Embodiment 4 | Embodiment 5 | Embodiment 6 |
|---|---|---|---|---|---|---|---|
| Conditional Expression (1) $1.0 < f1/f$ | | 1.65 | 1.58 | 1.53 | 1.73 | 1.38 | 1.71 |
| Conditional Expression (2) $1.0 < f2/f$ | | 30.35 | 14.85 | 15.58 | 7.52 | 20.16 | 9.40 |
| Conditional Expression (3) $0.8 < f4/f$ | | 0.99 | 1.28 | 1.19 | 1.17 | 0.95 | 1.25 |
| Conditional Expression (4) $1.0 < f123/f < 1.5$ | | 1.21 | 1.30 | 1.28 | 1.32 | 1.21 | 1.36 |
| Conditional Expression (5) $3.4 < f45/f < 9.1$ | | 6.64 | 4.15 | 4.66 | 4.27 | 8.33 | 3.72 |
| Conditional Expression (6) $1.50 < Nd < 1.65$ | L1 | 1.64 | 1.54 | 1.54 | 1.53 | 1.54 | 1.53 |
| | L2 | 1.54 | 1.64 | 1.54 | 1.64 | 1.54 | 1.53 |
| | L3 | 1.54 | 1.54 | 1.64 | 1.53 | 1.64 | 1.53 |
| | L4 | 1.54 | 1.54 | 1.54 | 1.53 | 1.54 | 1.53 |
| | L5 | 1.54 | 1.54 | 1.54 | 1.53 | 1.54 | 1.53 |
| Conditional Expression (7) $20 < \nu d < 70$ | L1 | 23.91 | 55.57 | 55.57 | 56.16 | 55.57 | 56.16 |
| | L2 | 55.57 | 23.91 | 23.91 | 56.16 | 23.91 | 56.16 |
| | L3 | 55.57 | 55.57 | 23.91 | 56.16 | 23.91 | 56.16 |
| | L4 | 55.57 | 55.57 | 55.57 | 56.16 | 55.57 | 56.16 |
| | L5 | 55.57 | 55.57 | 55.57 | 56.16 | 55.57 | 56.16 | wherein an object-side aspheric surface and an image-side aspheric surface of the fifth lens have a pole-change point in a position other than a point of intersection with an optical axis; and wherein a diffractive optical surface is formed on one of three surfaces from the image-side surface of the first lens to the image-side surface of the second lens.

2. The imaging lens according to claim 1, wherein the first lens is a biconvex lens.

3. The imaging lens according to claim 2, wherein the first lens has an aspheric shape in which a more distant portion from the optical axis has weaker positive refractive power.

4. The imaging lens according to claim 2, wherein the second lens is a meniscus lens having a convex surface on the object side.

5. The imaging lens according to claim 1, wherein the first lens has an aspheric shape in which a more distant portion from the optical axis has weaker positive refractive power.

6. The imaging lens according to claim 1, wherein the second lens is a meniscus lens having a convex surface on the object side.

7. The imaging lens according to claim 1, wherein in the third lens a more distant portion from the optical axis has weaker positive refractive power and the refractive power changes to negative refractive power in a peripheral portion.

8. The imaging lens according to claim 1, wherein the fourth lens has a meniscus shape with a concave surface on the object side near the optical axis and in the fourth lens, a more distant portion from the optical axis has weaker positive refractive power and the refractive power changes to negative refractive power in a peripheral portion.

9. The imaging lens according to claim 1, wherein conditional expressions (1) to (3) below are satisfied:

$$1.0 < f1/f \tag{1}$$

$$1.0 < f2/f \tag{2}$$

$$0.8 < f4/f \tag{3}$$

where
  f: focal length of the overall optical system of the imaging lens
  f1: focal length of the first lens
  f2: focal length of the second lens
  f4: focal length of the fourth lens.

10. The imaging lens according to claim 1, where a conditional expression (4) below is satisfied:

$$f123/f < 1.5 \tag{4}$$

where
  f: focal length of the overall optical system of the imaging lens
  f123: composite focal length of the first lens, the second lens, and the third lens.

11. The imaging lens according to claim 1, where a conditional expression (5) below is satisfied:

$$3.4 < f45/f < 9.1 \tag{5}$$

where
  f: focal length of the overall optical system of the imaging lens
  f45: composite focal length of the fourth lens and the fifth lens.

12. The imaging lens according to claim 1, wherein all the constituent lenses are made of plastic material and satisfy conditional expressions (6) and (7) below:

$$1.50 < Nd < 1.65 \tag{6}$$

$$20 < vd < 70 \tag{7}$$

where
  Nd: refraction index of each lens at d-ray
  vd: Abbe number of each lens at d-ray.

* * * * *